US008881112B2

(12) United States Patent
Corsetti et al.

(10) Patent No.: US 8,881,112 B2
(45) Date of Patent: Nov. 4, 2014

(54) QUALITY MEASURE TOOL FOR A COMPOSITE APPLICATION

(75) Inventors: Giorgio Corsetti, Rome (IT); Salvatore Branca, Rome (IT)

(73) Assignee: International Business Machines Corporation, Armonk, NY (US)

( * ) Notice: Subject to any disclaimer, the term of this patent is extended or adjusted under 35 U.S.C. 154(b) by 1396 days.

(21) Appl. No.: 12/331,846

(22) Filed: Dec. 10, 2008

(65) Prior Publication Data

US 2009/0164974 A1 Jun. 25, 2009

(30) Foreign Application Priority Data

Dec. 19, 2007 (EP) .................................. EP07123605

(51) Int. Cl.
*G06F 9/44* (2006.01)
*G06F 11/36* (2006.01)

(52) U.S. Cl.
CPC .............. *G06F 11/3616* (2013.01); *G06F 8/20* (2013.01)
USPC ............................ 717/126; 717/124; 717/141

(58) Field of Classification Search
None
See application file for complete search history.

(56) References Cited

U.S. PATENT DOCUMENTS

| 5,761,093 | A | * | 6/1998 | Urbish et al. ................. 700/107 |
| 5,903,453 | A | * | 5/1999 | Stoddard II ...................... 700/79 |
| 5,918,035 | A | * | 6/1999 | Van Praet et al. ............... 703/22 |
| 6,035,121 | A | * | 3/2000 | Chiu et al. ..................... 717/141 |
| 6,219,805 | B1 | * | 4/2001 | Jones et al. ................... 714/38.1 |
| 6,434,738 | B1 | * | 8/2002 | Arnow .......................... 717/106 |
| 6,477,471 | B1 | | 11/2002 | Hedstrom et al. |
| 6,971,047 | B2 | * | 11/2005 | Mayer et al. ................... 717/124 |
| 7,093,235 | B2 | * | 8/2006 | Andrews et al. ............... 717/124 |
| 7,139,999 | B2 | * | 11/2006 | Bowman-Amuah .......... 717/101 |
| 7,149,734 | B2 | * | 12/2006 | Carlson et al. ....................... 1/1 |
| 7,322,024 | B2 | * | 1/2008 | Carlson et al. ................ 717/120 |
| 7,496,895 | B1 | * | 2/2009 | Mosterman et al. .......... 717/126 |
| 7,506,312 | B1 | * | 3/2009 | Girolami-Rose et al. ..... 717/124 |
| 7,617,415 | B1 | * | 11/2009 | Kadakia .......................... 714/26 |
| 7,882,485 | B2 | * | 2/2011 | Feblowitz et al. ............. 717/126 |

(Continued)

OTHER PUBLICATIONS

Ammar et al. "A Methodology for Risk Assessment of Functional Specifications of Software Systems Using Colored Petri Nets" IEEE Nov. 1997 <http://ieeexplore.ieee.org/stamp/stamp.jsp?tp=&arnumber=637171> pp. 108-117.*

(Continued)

*Primary Examiner* — Thuy Dao
*Assistant Examiner* — Samuel Hayim
(74) *Attorney, Agent, or Firm* — Nelson & Nelson; Daniel P. Nelson; Alexis V. Nelson

(57) ABSTRACT

A method for estimating a quality measure of a composite application is presented. The method may include receiving a set of sequence diagrams describing interactions between pairs of components in a composite application. Each sequence diagram may describe a functional use case of the composite application. Component quality metrics may also be received, such that each component quality metric corresponds to a component of the composite application. A quality estimation may be calculated for each use case of the composite application. The quality estimation may be determined as a function of one or more of the component quality metrics. A quality measure of the composite application may then be calculated as a function of the quality estimation for each use case. The quality measure of the composite application may be output.

14 Claims, 5 Drawing Sheets

(56) References Cited

U.S. PATENT DOCUMENTS

| | | | |
|---|---|---|---|
| 7,890,924 B2* | 2/2011 | Raffo | 717/105 |
| 7,917,897 B2* | 3/2011 | Bassin et al. | 717/131 |
| 7,937,689 B2* | 5/2011 | Holden | 717/126 |
| 8,024,807 B2* | 9/2011 | Hall et al. | 726/25 |
| 8,146,059 B2* | 3/2012 | Ponsford et al. | 717/124 |
| 2002/0166112 A1* | 11/2002 | Martin et al. | 717/124 |
| 2003/0236690 A1* | 12/2003 | Johnston-Watt et al. | 705/7 |
| 2004/0117761 A1* | 6/2004 | Andrews et al. | 717/101 |
| 2005/0081104 A1* | 4/2005 | Nikolik | 714/38 |
| 2005/0160103 A1* | 7/2005 | Raffo | 707/100 |
| 2005/0160395 A1* | 7/2005 | Hughes | 717/102 |
| 2005/0204344 A1* | 9/2005 | Shinomi | 717/141 |
| 2005/0216894 A1* | 9/2005 | Igarashi | 717/126 |
| 2005/0223361 A1* | 10/2005 | Belbute | 717/124 |
| 2005/0283834 A1* | 12/2005 | Hall et al. | 726/24 |
| 2006/0101435 A1* | 5/2006 | Akilov et al. | 717/141 |
| 2006/0149717 A1* | 7/2006 | Bird et al. | 707/3 |
| 2006/0184928 A1* | 8/2006 | Hughes | 717/168 |
| 2006/0282823 A1* | 12/2006 | Li et al. | 717/121 |
| 2007/0055959 A1* | 3/2007 | Eckardt et al. | 717/126 |
| 2008/0104577 A1* | 5/2008 | Holden | 717/126 |
| 2008/0155508 A1* | 6/2008 | Sarkar et al. | 717/126 |
| 2009/0070734 A1* | 3/2009 | Dixon et al. | 717/102 |

OTHER PUBLICATIONS

Goseva-Popstojanova et al. "Architectural-Level Risk Analysis Using UML" IEEE Oct. 2003 <http://www.computer.org/comp/trans/ts/2003/10/e0946.pdf> pp. 946-960.*

Ramesh Pusala, "Operational Excellence through Efficient Software Testing Metrics", Infosys, Aug. 2006, <http://www.infosys.com/IT-services/independent-validation-testing-services/white-papers/Documents/operational-excellence.pdf>, pp. 1-11.*

Hideto Ogasawara et al., "Experiences of Software Quality Management Using Metrics through the Life-Cycle", IEEE, 1996, <http://ieeexplore.ieee.org/stamp/stamp.jsp?tp=&arnumber=493414>, pp. 179-188.*

Yue Jiang et al., "Comparing Design and Code Metrics for Software Quality Prediction", ACM, 2008, <http://delivery.acm.org/10.1145/1380000/1370793/p11-jiang.pdf>, pp. 11-18.*

Choi, Jinho, "Architectural-Level Risk Analysis Using UML," Power Point Presentation of article by Katerina Goseva-Popstojanova, et al., Jun. 8, 2010, KAIST SE LAB 2010, pp. 1-27.

Wang, T., et al., Architectural Level Risk Assessment Tool Based on UML Specifications, 2003, Proceedings of the 25th International Conference on Software Engineering (ICSE '03), Lane Department of Computer Science and Electrical Engineering, West Virginia University, Morgantown, WV, USA.

Ammar, H.H., et al., "A Methodology for Risk Assessment of Functional Specification of Software Systems Using Colored Petri Nets," 1997 IEEE, pp. 108-117, Department of Computer Science and Electrical Engineering, West Virginia University, USA.

Goseva-Popstojanova, Katerina, et al., "Architectural-Level Risk Analysis Using UML," IEEE Transactions on Software Engineering, vol. 29, No. 10, Oct. 2003, pp. 946-960.

* cited by examiner

QUALITY MEASURE TOOL FOR A COMPOSITE APPLICATION

BACKGROUND

An important trend in software engineering is componentization, or the ability to build a composite application using a set of software components. The software components included in a new composite application may be already available at the time the new composite application is built. Thus, the components may be partially or completely reused.

In such a scenario, a challenge facing a development team is to estimate the quality of the composite application. Indeed, the development team may be responsible for developing only a small fraction of the code, with the rest of the code being reused.

SUMMARY

Embodiments of the invention have been developed to estimate a quality measure of a composite application.

A method for estimating a quality measure of a composite application in accordance with an embodiment of the present invention may include receiving a set of sequence diagrams describing interactions between pairs of components in a composite application. Each sequence diagram may describe a functional use case of the composite application. Component quality metrics may also be received, such that each component quality metric corresponds to a component of the composite application. A quality estimation may be calculated for each use case of the composite application. The quality estimation may be determined as a function of one or more of the component quality metrics. A quality measure of the composite application may then be calculated as a function of the quality estimation for each use case. The quality measure of the composite application may be output.

A corresponding computer program product and system are also disclosed and claimed herein.

BRIEF DESCRIPTION OF THE DRAWINGS

In order that the advantages of the disclosure will be readily understood, a more particular description of embodiments of the invention briefly described above will be rendered by reference to specific embodiments illustrated in the appended drawings. Understanding that these drawings depict only typical embodiments of the invention and are not therefore to be considered limiting of its scope, embodiments of the invention will be described and explained with additional specificity and detail through use of the accompanying drawings, in which.

DETAILED DESCRIPTION OF THE INVENTION

Figure 1:
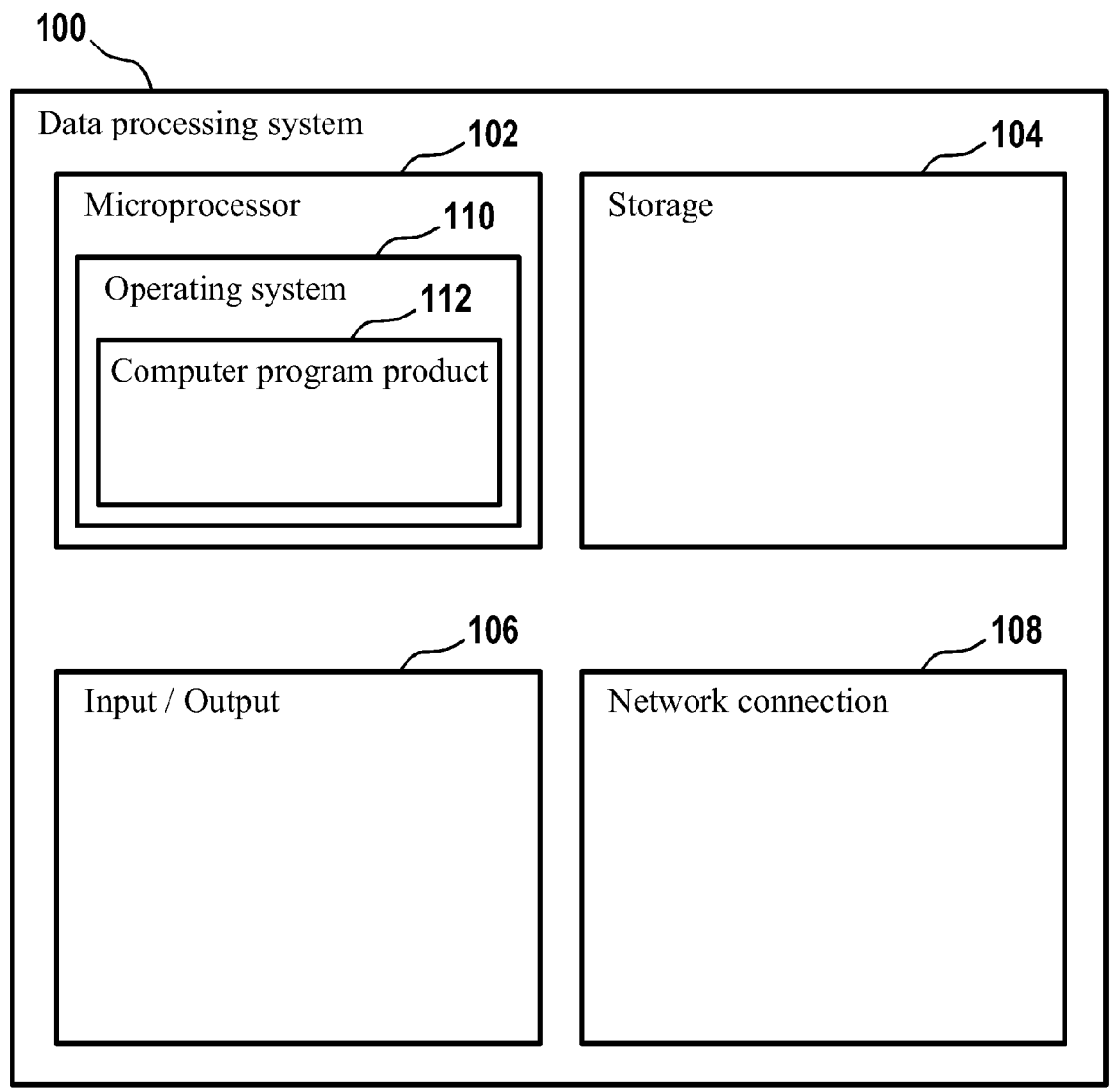
FIG. 1 is a block diagram of a data processing system in accordance with certain embodiments of the present invention.

It will be readily understood that the components of the embodiments of the invention, as generally described and illustrated in the Figures herein, could be arranged and designed in a wide variety of different configurations. Thus, the following more detailed description of the embodiments of the invention, as represented in the Figures, is not intended to limit the scope of the claims, but is merely representative of certain examples of presently contemplated embodiments in accordance with the invention. The presently described embodiments will be best understood by reference to the drawings, wherein like parts are designated by like numerals throughout.

As will be appreciated by one skilled in the art, embodiments of the invention may be embodied as an apparatus, method, or computer program product. Furthermore, the present invention may take the form of an entirely hardware embodiment, an entirely software embodiment (including firmware, resident software, micro-code, etc.) or an embodiment combining software and hardware elements. Hardware and/or software elements provided to perform various tasks may be generally referred to herein as "modules." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CDROM"), an optical storage device, transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, a data processing system 100 in accordance with embodiments of the invention may include a microprocessor 102, storage 104, an input/output device 106 and a network connection 108. The microprocessor 102 may execute an operating system 110. The operating system 110 may execute a computer program product 112. Storage 104 may store codes of the operating system 110 and of the computer program product 112. The codes of the operating system 110 and computer program product 112 may be loaded for execution onto the microprocessor 102.

The computer program product 112 may be regarded as a tool for estimating a quality measure of a composite application. The computer program product 112 may take a set of sequence diagrams that describe interactions between pairs of components and component quality metrics as inputs. From these inputs, the computer program product 112 may output a quality measure of a composite application. A set of sequence diagrams, and the component quality metrics may be stored in storage 104. These may be received through the network connection 108, or may be input by a user using the input/output 106.

The input/output device 106 may include a keyboard, a mouse, or other input device. The input/output device 106 may additionally include a display, a sound output device, or the like.

Figure 2:
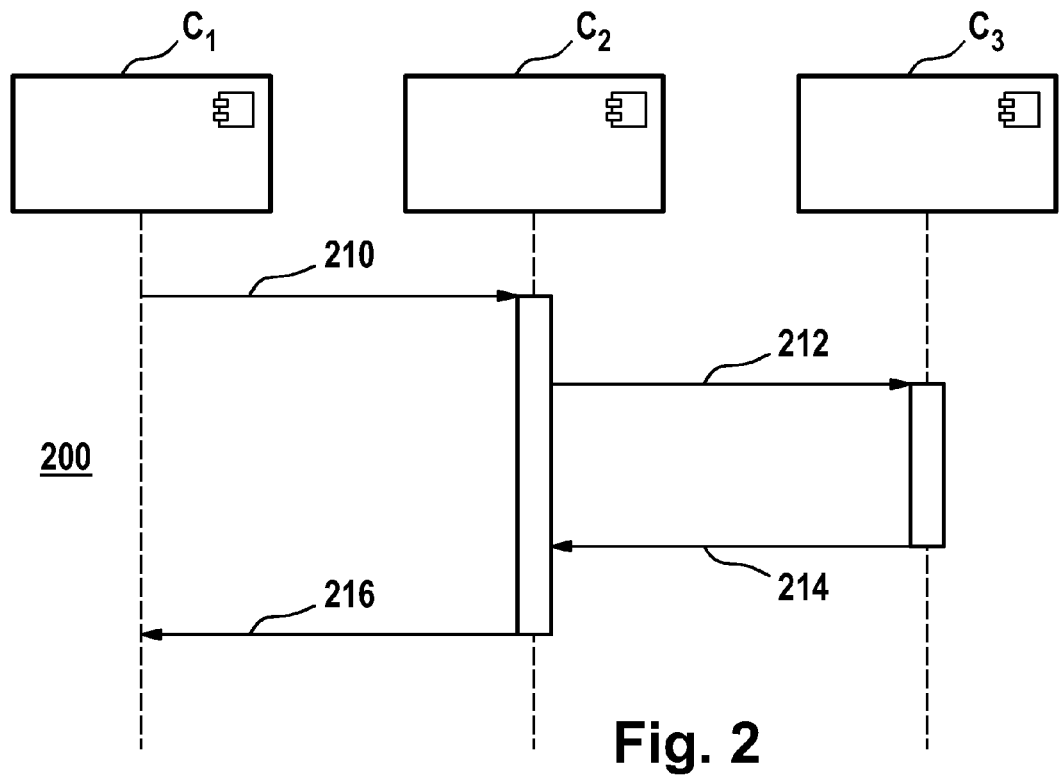
FIG. 2 is a sequence diagram of a first embodiment of the invention.
Figure 4:
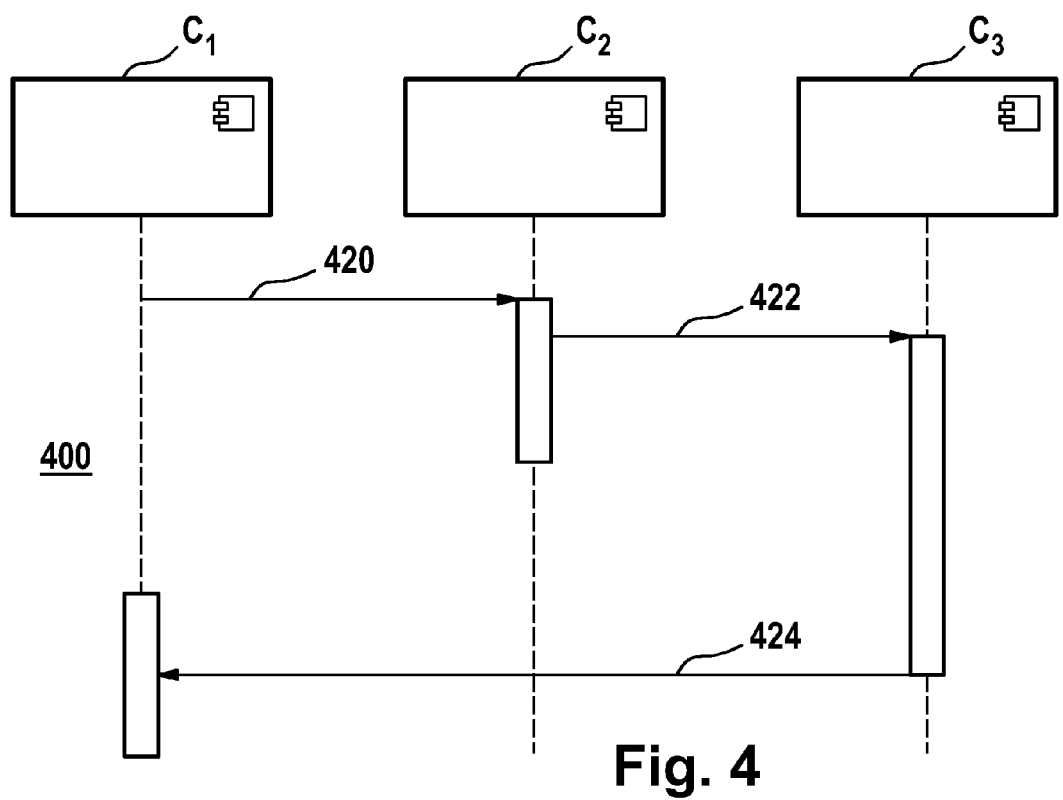
FIG. 4 is a sequence diagram of a second embodiment of the invention.
Figure 3:
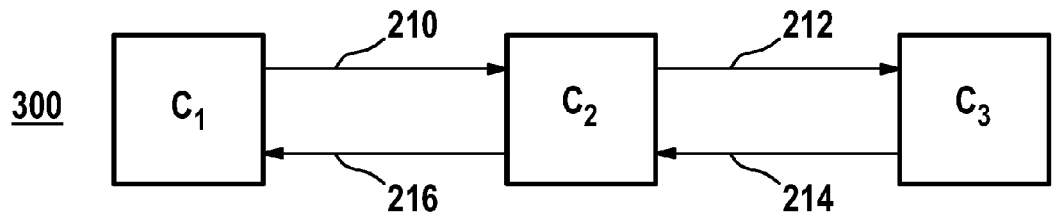
FIG. 3 is an interaction diagram of the first embodiment.
Figure 5:
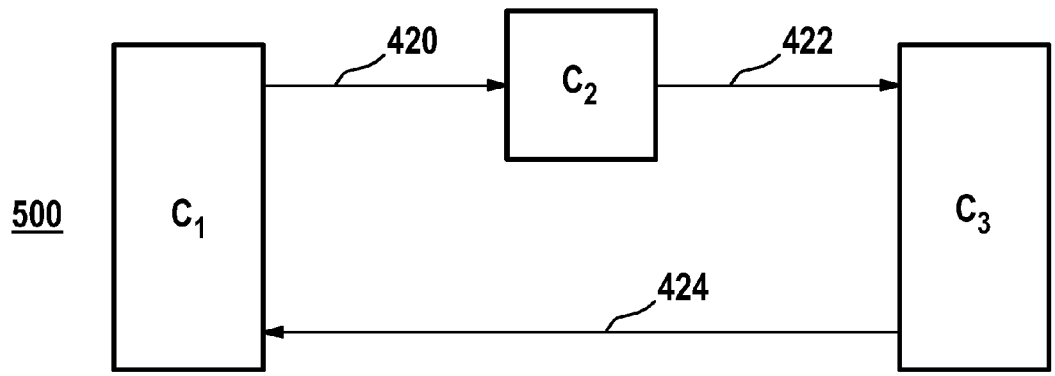
FIG. 5 is an interaction diagram of the second embodiment.
Figure 7:
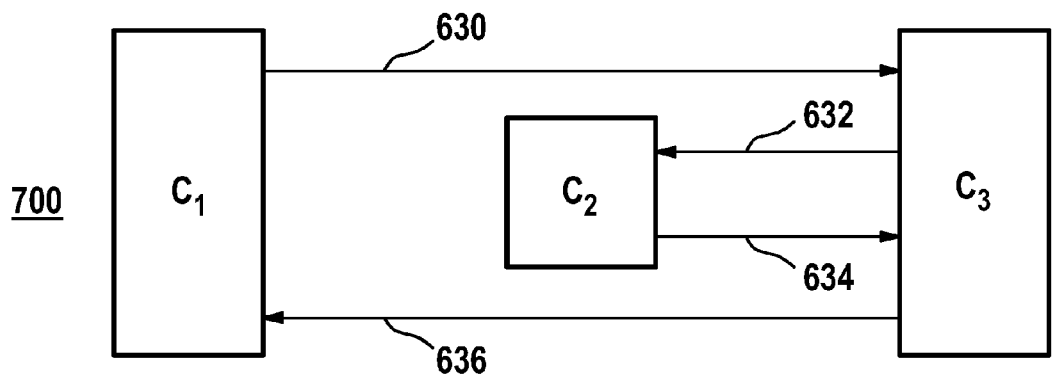
FIG. 7 is an interaction diagram of the third embodiment.
Figure 6:
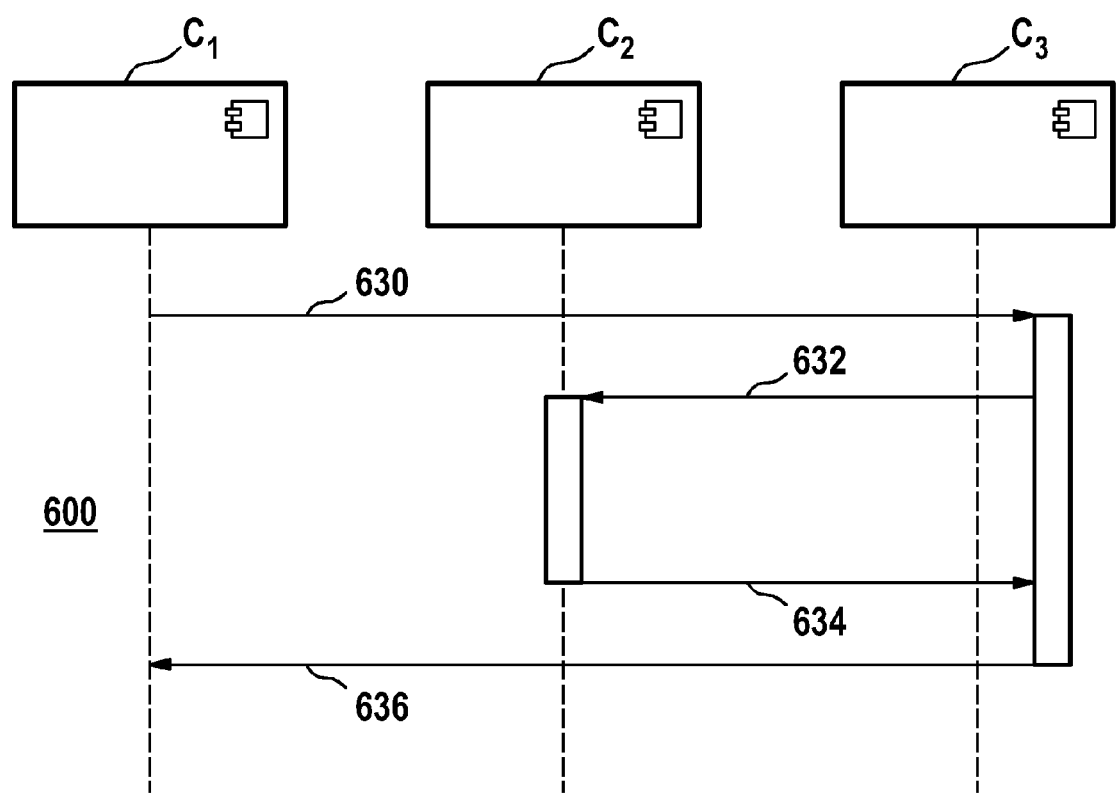
FIG. 6 is a sequence diagram of a third embodiment of the invention.

FIGS. 2, 4 and 6 show sequence diagrams of different use cases. Interaction diagrams corresponding to these use cases are shown in FIGS. 3, 5, and 7. Methods for calculating a quality measure of a composite application that includes the components shown in these Figures will be explained in more detail below, with reference to the Figures.

The expected quality of an application may be defined in terms of a defect rate. A defect rate may be, for example, the number of defects per million lines of source code, the number of defects per function point, or the number of defects per other unit. Expected quality of an application may also be defined in terms of reliability. Reliability may be the number of failures per hours of operation, the mean time to failure, or the probability of failure of operation in a specified time.

Methods consistent with the present invention may be applied to either a defect rate or reliability of an application to estimate its quality. To estimate the quality of a composite application, UML diagrams may be used, such as sequence diagrams, to emphasize the flow and control of data among different components in the application being modeled.

Use cases may be identified with sequence diagrams describing all the interactions between components involved in the composite software application being developed. Since the interactions between components are shown in the sequence diagrams, the sequence diagrams may be used with the quality metrics for each component to estimate the quality measure for the complete composite application.

The quality estimation for each component may be obtained by considering each component as a single box. In the following, the quality metric for a component is referenced as $C_i$. The quality metric of a single component may be defined as a defect rate, for example, the number of defects per thousand lines of code ("KLOC"), the number of defects per function point, or the like. Thus, the quality metric of a single component may be given by:

$$C_i = (\# \text{ defect})/(\# \text{ KLOC})$$

The values of (# defect) and (# KLOC) may be available for each component as a stand-alone component, or may easily be calculated using the code repository of the component. If the component has yet to be developed, the values may be considered as estimates.

The quality estimation for each use case described by the sequence diagrams is referenced in the following as $R_i$. The quality estimation of a single use case can be defined as the average of the products of the $C_i$ for each interaction present in the sequence diagram.

$$Ri = (\Sigma_{k,j} C_k * C_j)/(\# \text{ interactions between components K and J in the Use Case i})$$

The total quality estimation of the software application to be developed, referenced as R, may be defined as a weighted average of the Ri:

$$R = \Sigma_{i=1,n} R_i * w_i$$

As provided above, $w_i$ may represent the weight of the single use case for the design package under analysis. The weight $w_i$ may be a value between 0 and 1. N may represent the total number of use cases in the design package under analysis.

The weight, $w_i$, may represent the relative importance of the use case compared with the other use cases in the composite application. Thus, the quality metrics of the single components may enable an estimation of the quality measure for the composite application to be derived. It is noted that the quality measure is based on a real interaction model, that model being for use cases of interactions between components used in delivering the functionality of the composite application.

An example of the calculation of a quality measure for a composite application is given below with reference to use cases described by FIGS. 2, 4, and 6. FIGS. 3, 5, and 7 show the interactions between components.

In this example, a composite software application composed of three different components, $C_1$, $C_2$ and $C_3$, is considered. The interactions between components $C_1$, $C_2$ and $C_3$ are described by three sequence diagrams which describe different use cases.

A first use case is described by FIG. 2. The first use case 200 includes interaction 210 between $C_1$ and $C_2$, interaction 212 between $C_2$ and $C_3$, interaction 214 between $C_3$ and $C_2$, and interaction 216 between $C_2$ and $C_1$. The interactions between components of the first use case are also shown in FIG. 3.

FIG. 4 shows interactions between components $C_1$, $C_2$ and $C_3$ in a second use case 400. The second use case 400 may include an interaction 420 between $C_1$ and $C_2$, an interaction 422 between $C_2$ and $C_3$, and an interaction 424 between $C_3$ and $C_1$. These interactions are also shown in FIG. 5.

FIG. 6 shows a third use case 600. The third use case 600 may include an interaction 630 between $C_1$ and $C_3$, an interaction 632 between $C_3$ and $C_2$, an interaction 634 between $C_2$ and $C_3$, and an interaction 636 between $C_3$ and $C_1$.

As before, the quality estimations for single components may be given by:

$$C_i = (\# \text{ defect})/(\# \text{ KLOC})$$

In this example, it may be assumed that the defect rates for $C_1$ and $C_3$ are known, as they have already been determined from the development of these components. Further, it may be assumed that component $C_2$ is under development, and therefore the total defect rate for the application may be calculated using an estimate for the defect rate of $C_2$.

A quality estimation for each use case described by the sequence diagrams may be calculated as follows. The quality estimation of the single use case may be defined as the average of the product of the $C_i$ for each interaction present in the sequence diagram. Considering the three use cases discussed above, the components interacting, and the number of interactions, we have:

$$R_1 = (C_1 C_2 + C_2 C_3)/2 \quad \text{for the first Use Case}$$

$$R_2 = (C_1 C_2 + C_2 C_3 + C_3 C_1)/3 \quad \text{for the second Use Case}$$

$$R_3 = (C_1 C_3 + C_2 C_3)/2 \quad \text{for the third Use Case}$$

The quality measure for the composite application may then be calculated, defined as the weighted average of the single $R_i$:

$$R = \Sigma_{i=1,3} R_i * w_i$$

where $w_i$ represents the weight of the single use case.

Once R has been estimated, a development team may make adjustments to the components used in the composite application and their interactions to attempt to minimize R. For example, different components that deliver the same functionalities as $C_1$ and $C_2$ may be used to minimize R.

In prior art methods, the quality of the composite application is often assumed to be the same as the quality of the component developed at the time. In the present example, that component is $C_2$. Assuming equal weighting of the three use cases, R may be represented by:

$$R = (1/3) \left[ ((C_1 C_2 + C_2 C_3)/2) + ((C_1 C_2 + C_2 C_3 + C_3 C_1)/3) + ((C_1 C_3 + C_2 C_3)/2) \right]$$

Assuming the following values for the components:
$C_1$=1.5 defect/KLOC
$C_2$=1.2 defect/KLOC
$C_3$=2 defect/KLOC,
and taking R as the quality metric of the component being developed, as taught in the prior art, R may be obtained as follows:

$$R' = C_2 = 1.2 \text{ defect/KLOC}$$

However, using the method discussed above, a different value for R may be obtained:

$$R'' = C_2 = 2.4 \text{ defect/KLOC}$$

This simple example shows that embodiments of the present method may provide a more accurate result for the quality measure by including interdependencies between components in calculating the quality measure for the composite application.

Figure 8:
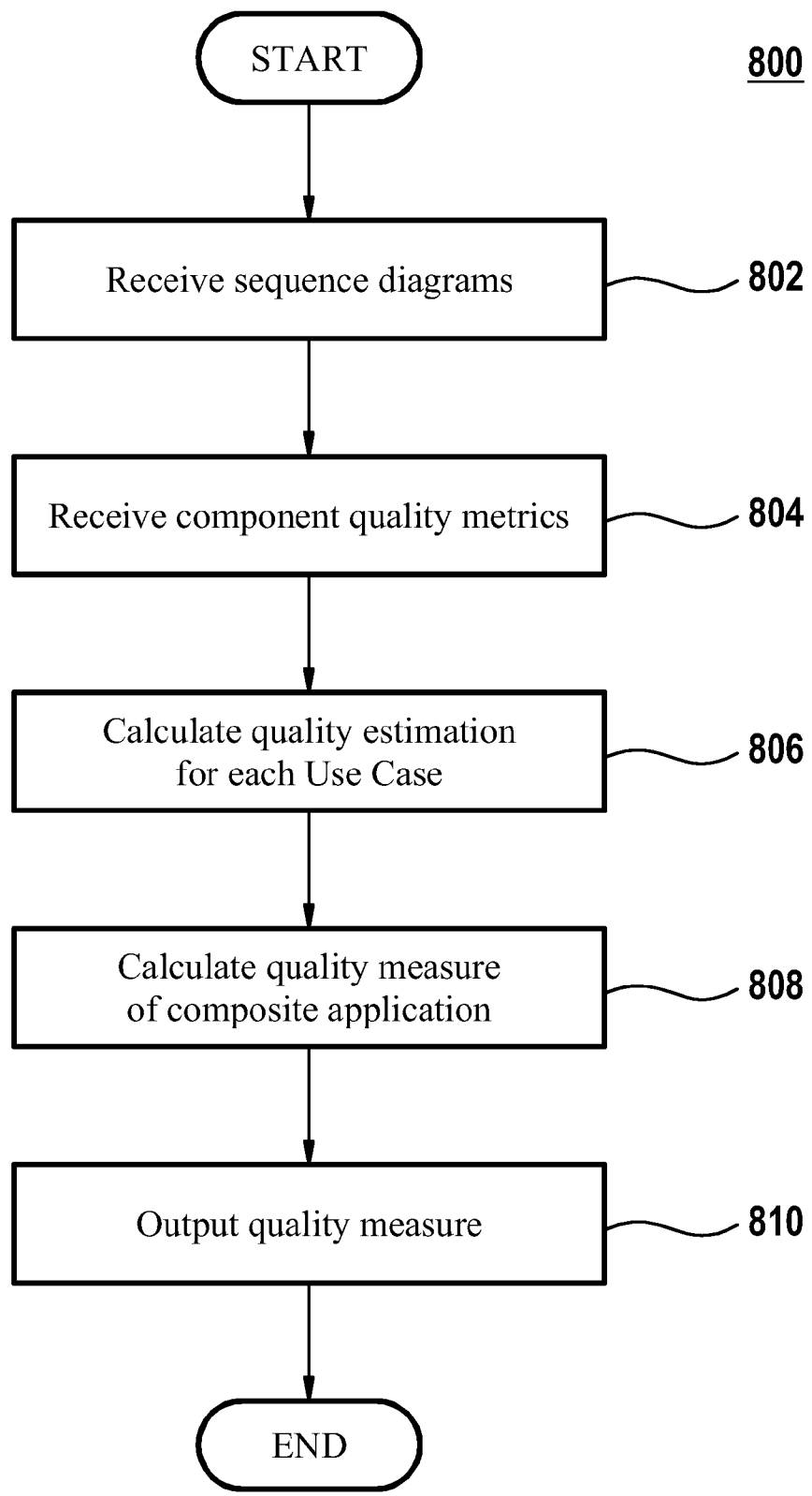
FIG. 8 is a flow diagram illustrating a method for estimating a quality measure for a composite application in accordance with the present invention.

FIG. 8 shows a method 800 for calculating a quality measure of a composite application. In step 802, sequence diagrams for the composite application may be received. The sequence diagrams may describe all the functional use cases of the composite application. In step 804, component quality metrics for all of the components of the composite application may be received. In certain embodiments, the components may be existing components which are being reused in the composite application. In such a case, the quality metrics may be known existing values. Alternatively, some of the components may be developed specifically for the composite application, in which case the quality metrics may be estimates.

In step 806, a quality estimation for each use case may be calculated. The quality estimation for each use case may be calculated as a function of the single component quality metrics received in step 804.

In step 808, a quality measure for the composite application may be calculated. The quality measure for the composite application may be calculated as a function of the quality estimation for each use case calculated in step 806. In step 810, the quality measure calculated in step 808 may be output.

The invention claimed is:

1. A method for estimating a quality measure of a composite application, the method comprising:
receiving a set of sequence diagrams describing interactions between pairs of components in a composite application, each sequence diagram describing a functional use case of the composite application;
receiving a plurality of component quality metrics, wherein each of the plurality of component quality metrics is associated with a component of the composite application;
calculating a quality estimation for each use case of the composite application by calculating an average of products of the quality metrics for each interacting pair of components in the associated sequence diagram;
calculating a quality measure of the composite application by summing the quality estimation for each use case multiplied by a weight value, wherein the weight value indicates an importance of the corresponding use case; and
outputting the quality measure of the composite application.

2. The method of claim 1, wherein each of the plurality of component quality metrics comprises a defect rate corresponding to a component.

3. The method of claim 1, wherein each of the plurality of component quality metrics comprises a distribution of a defect rate corresponding to a component.

4. The method of claim 1, wherein each of the plurality of component quality metrics comprises a reliability estimate corresponding to a component.

5. The method of claim 1, wherein at least one of the plurality of component quality metrics comprises an estimation.

6. The method of claim 1, wherein at least one of the plurality of component quality metrics comprises a value known from testing the component.

7. A computer program product for estimating a quality measure of a composite application, the computer program product comprising:
- a non-transitory computer-readable storage medium having computer-usable program code stored therein, the computer-usable program code comprising:
  - computer-usable program code for receiving a set of sequence diagrams describing interactions between pairs of components in a composite application, each sequence diagram describing a functional use case of the composite application;
  - computer-usable program code for receiving a plurality of component quality metrics, wherein each of the plurality of component quality metrics is associated with a component of the composite application;
  - computer-usable program code for calculating a quality estimation for each use case of the composite application by calculating an average of products of the quality metrics for each interacting pair of components in the associated sequence diagram;
  - computer-usable program code for calculating a quality measure of the composite application by summing the quality estimation for each use case multiplied by a weight value, wherein the weight value indicates an importance of the corresponding use case; and
  - computer-usable program code for outputting the quality measure of the composite application.

8. The computer program product of claim 7, wherein each of the plurality of component quality metrics comprises a defect rate corresponding to a component.

9. The computer program product of claim 7, wherein each of the plurality of component quality metrics comprises a distribution of a defect rate corresponding to a component.

10. The computer program product of claim 7, wherein each of the plurality of component quality metrics comprises a reliability estimate corresponding to a component.

11. The computer program product of claim 7, wherein at least one of the plurality of component quality metrics comprises an estimation.

12. The computer program product of claim 7, wherein at least one of the plurality of component quality metrics comprises a value known from testing the component.

13. An apparatus for estimating a quality measure of a composite application, the apparatus comprising:
- at least one processor;
- at least one memory device coupled to the at least one processor and storing modules for execution on the at least one processor, the modules comprising:
  - a use case module to receive a set of sequence diagrams describing interactions between pairs of components in a composite application, each sequence diagram describing a functional use case of the composite application;
  - a component quality metric module to receive a plurality of component quality metrics, wherein each of the plurality of component quality metrics is associated with a component of the composite application;
  - a quality estimation module to calculate a quality estimation for each use case of the composite application by calculating an average of products of the quality metrics for each interacting pair of components in the associated sequence diagram;
  - a quality measure module to calculate a quality measure of the composite application by summing the quality estimation for each use case multiplied by a weight value, wherein the weight value indicates an importance of the corresponding use case; and
  - an output module to output the quality measure of the composite application.

14. The apparatus of claim 13, wherein each of the plurality of component quality metrics comprises a defect rate corresponding to a component.

* * * * *